Nov. 29, 1966  A. R. COLES  3,288,358
WIND MACHINE CONSTRUCTION
Filed Sept. 4, 1964  2 Sheets-Sheet 1

INVENTOR,
ALVA RICHARD COLES;
BY
ATTORNEY

United States Patent Office 3,288,358
Patented Nov. 29, 1966

3,288,358
WIND MACHINE CONSTRUCTION
Alva Richard Coles, Burbank, Calif., assignor to National Frost Protection Co., Inc., Burbank, Calif., a corporation of California
Filed Sept. 4, 1964, Ser. No. 394,504
6 Claims. (Cl. 230—254)

The present invention relates to wind machines of the type useful in orchards for protection of crops against frost.

The University of California Citrus Experiment Station, Riverside, California, has determined by experiment that a wind machine will circulate warm air which is fifty to one hundred feet above the ground and blow the warm air which is 2 to 10° F. warmer than the air at ground level, over the trees. The Experiment Station likewise determined that if the deep soil around the trees has been warmed by the sun during the day and particularly if the soil is damp from the surface down, the heat deep in the ground will be conducted to the surface faster and will be circulated by the wind machine in the same manner as heat from a fireplace is circulated by a fan.

It has been determined that in order to produce effective frost protection of crops with a wind machine that the machine should provide a minimum of seven to eight horsepower per acre and be equipped with a propeller fan to produce an air stream of maximum mass at a velocity of approximately sixty-five feet per second. The propeller fan should be rotated around a vertical axis to give maximum frost protection and I have found that a rotation of the propeller fan once every four and one-half minutes has proved satisfactory for the reason that restratification of the air occurs in approximately five minutes. Therefore, it is important that the gain in temperature due to temperature inversion as well as deep soil temperature is lost if restratification of the air occurs and unless the air jet from the propeller fan is again allowed to mix the air before complete restratification thereof.

Non-symmetric aerodynamic loading on the blades of the propeller fan together with divergent instability of the propeller fan blades from operation in gusty or cross winds generates moments of varying magnitude and direction in the propeller fan shaft which causes rotation of the propeller fan about a vertical axis to be jerky. The moments produced by jerky operation together with the moments produced by a vertical drive shaft for the propeller fan, unless controlled, causes failure in the rotation head assembly. The wind machine of the present invention may consist, by way of example, of a tubular column rising vertically above the ground to a certain height which may be thirty feet or greater. The top of the column is provided with a rotating head assembly which rotates on a vertical axis and at the speed heretofore mentioned of one revolution in a period of four and one-half minutes. The head assembly includes a shaft which carries a propeller fan which may be driven by a suitable motor at the top of the column or from the ground by a motor turning a vertical shaft within the column which drives the propeller shaft and likewise causes rotation around the vertical axis of the head assembly. However, I have determined that non-symmetric aerodynamic loading on the blades of the propeller fan as well as instability thereof when operated in gusty or cross winds, generates moments of varying magnitude and direction in the propeller fan shaft and which causes rotation of the head assembly about its vertical axis to be jerky. The moments produced by jerky and intermittent operation together with the moments produced by the vertical drive shaft torque, unless restrained, may cause failure in the head rotation parts.

An object of the invention is the provision of means effecting uninterrupted and smooth rotation of the head assembly of a wind machine about a vertical axis and which prevents divergent moments being transmitted to the rotation apparatus.

A further object of my invention is to provide an automatic lubrication system for the rotating head assembly of the wind machine.

A further object is the provision of a structure for a wind machine adapted to prevent failure of rotation parts of the head assembly.

Other objects and advantages include a structure which requires little attention by a workman, which will operate efficiently over long periods of time and which is generally superior to wind machine structures now known to the inventor.

With the above mentioned and other objects in view, the invention consists in the novel and useful provision, formation, construction, association and relative arrangement of parts, members and features, all as shown in one embodiment in the accompanying drawings, described generally and more particularly pointed out in the claims.

In the drawings:

FIGURE 4 is a fragmentary, partially sectional view on an enlarged scale of transmission means situated at ground level;

FIGURE 5 is a fragmentary, partially sectional top plan view of one member of a drag bearing used in the practice of the invention;

FIGURE 6 is a fragmentary cross sectional view of a lubricating means used in the practice of the invention; and, FIGURE 7 is an orifice plug shown in cross section and on an enlarged scale, used in the lubricating device of FIGURE 6.

Figure 1:
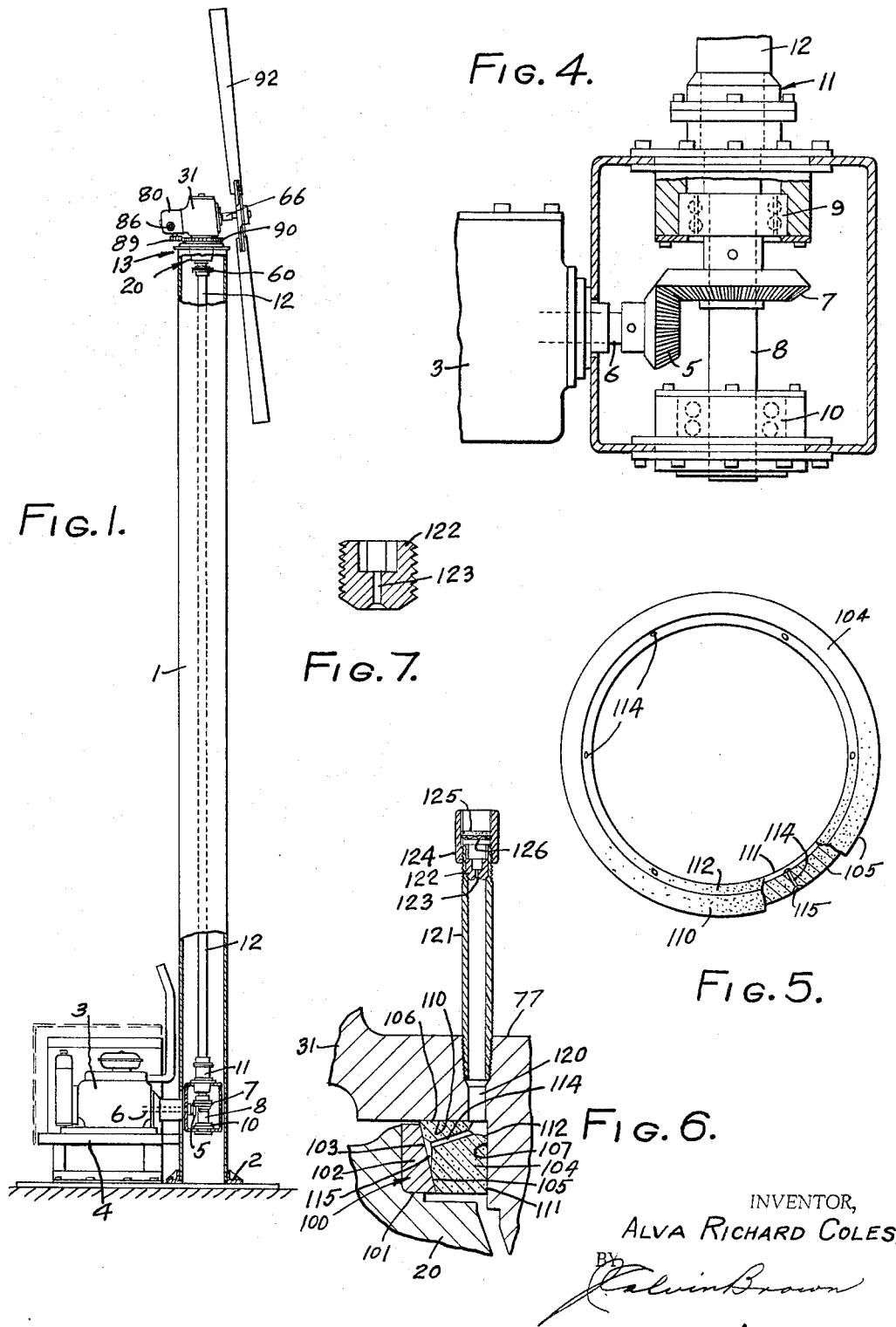
FIGURE 1 is a fragmentary, partially sectional view, and in elevation, of one form of wind machine, as an entirety.

Referring to the drawings, I have shown in FIGURE 1 one type of wind machine which includes an elongated vertical column 1 anchored to a suitable base 2 at ground level with an engine 3 which may be of the internal combustion type or other type supported upon a mounting 4, the engine shaft being adapted to drive a suitable transmission. As shown in FIGURE 4, the transmission in its simplest form includes a beveled gear 5 secured to the engine shaft 6, the teeth of which beveled gear 5 meshes with the teeth of beveled gear 7 mounted upon a shaft 8. The shaft 8 is supported for rotation between top and bottom bearings 9 and 10 secured within a suitable motor transmission casing. The shaft 8 is adapted to drive through a universal joint designated generally as 11, an elongated shaft 12 extending axially of the vertical column 1 to the top 13 of said column. It may be mentioned that in actual commercial practice the column is preferably formed from steel plate and may have an outside diameter of 24″ and a thickness of one-quarter of an inch and a height of 31′ or more.

The top 13 of the column is provided with an annular plate 14 welded or otherwise secured at 15 to the column. The shaft 12 is supported at its upper end by bearings to be hereinafter described, as well as by the bearings 9 and 10 in the motor transmission casing.

Figure 3:
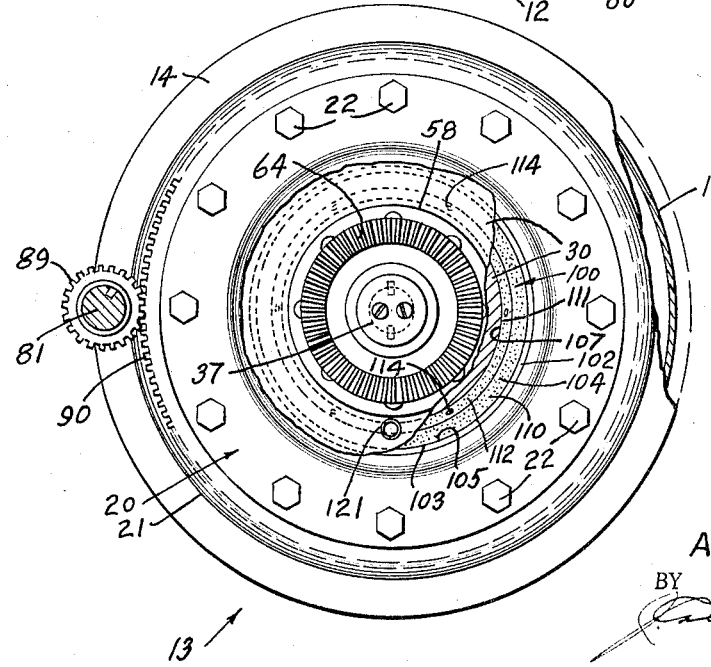
FIGURE 3 is a fragmentary sectional view on the line 3—3 of FIGURE 2.

A bearing block 20 is supported by the top plate 14. The bearing block 20 is of inverted hollow frusto conical form with the frusto conical portion passed through the central opening of the annular top plate 14. The bearing block 20 is provided at its upper base end with an annular flange 21 which overlaps the top plate 14 and provides a support for the bearing block 20. Thus the conical portion of the bearing block depends within the column 1. Flange 21 of the bearing block is anchored to the top plate 14 by means of bolts 22 passed through aligned transverse bores in the flange 21 and the top plate in a spaced annular series as shown in FIGURE 3. The bearing block 20 is adapted to receive within the tapered bore 23 thereof, an inverted conical surfaced hub 30 which forms a part of the main gear casing 31 of the head assembly 25. The small bases of both the bearing block and the hub 30, are formed to confine therebetween a bearing 32. The bearing may comprise the usual structure of a pair of annular race members 33 and 34 with bearing members therebetween with a nut 35 and lock washer 36 for securing the roller bearing in position, the nut being screw threaded to the member 30.

Before further detailing the main gear casing of the head assembly 25, it is to be observed that there is a shaft 37 confined within axial bore 38 of hub 30. The bore 38 varies as to bore diameter at 39, 40, and 41 to provide annular shoulders at 42, 43 and 44. The shoulder at 42 supports and confines a bearing 48 similar to the bearing at 32 and which surrounds the reduced diameter portion 37a of the shaft 37. A seal 50 surrounds the shaft portion 37a and rests upon the shoulder 43 while a seal 52 abuts the internal shoulder 44 of hub 30. The large base end of hub 30 is counter bored at 54 to provide a shoulder 55 which supports a large bearing 56 which surrounds the upper end of shaft 37 with an annular plate permitting passage of the shaft 37 therethrough and secured to part 30 for maintaining the seated position of the bearing 56 as shown at 58.

The upper end of the shaft 12 is secured to the shaft 37 by means of a coupling 60 which may include an universal joint of ordinary construction. Rotation of shaft 12 produces rotation of shaft 37, the shaft 12 being supported by the bearing arrangement for the shaft 37 and for shaft 8 as previously described. As hub 30 is adapted to be slowly rotated relative to the bearing block 20, attention is called to the fact that the conical inner surface 23 of the bearing block 20 and the conical outer surface of hub 30 are spaced apart at 61, the spacing leading to the bearing 32.

Figure 2:
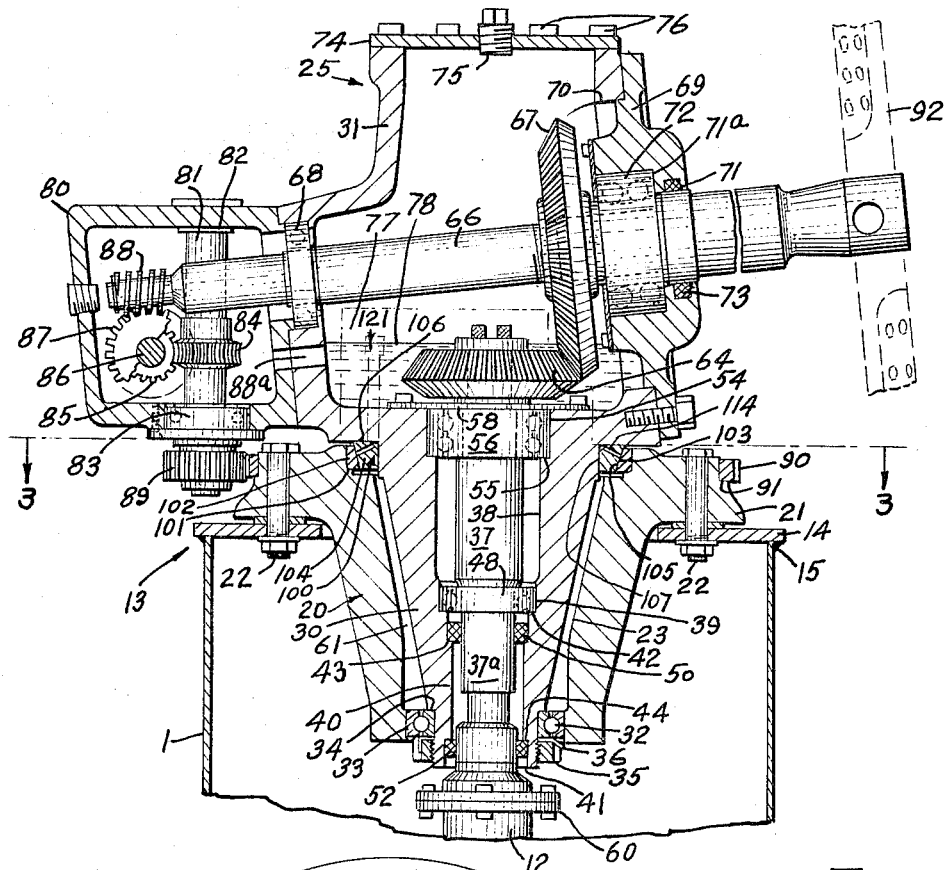
FIGURE 2 is a fragmentary cross sectional view of a portion of the tubular column of a wind machine supporting a vertical drive shaft assembly and a rotating head assembly at the top of the column.

The shaft 37 carries at its upper end a pinion 64 which pinion is above the plate 58 and within the main gear casing 31. The main gear casing 31 is so formed as to provide for the support of a shaft 66 lying at an angle to horizontal, and which carries a beveled gear 67, the teeth of which are in mesh with the pinion 64. As shown, the main gear casing is provided with a bearing 68 supported in a wall of the casing and through which the shaft 66 is passed for supporting one end of the shaft. The casing 31 is provided with a cover 69. The cover 69 is fitted over and partially within an opening 70 of the main gear casing 31, the cover being formed with a bore 71 for passage of the shaft 66 therethrough and outwardly from the cover 69 as shown in FIGURE 2. The cover is counterbore to provide a shoulder at 71a to house a bearing designated generally as 72 which may include a pair of race members with interposed bearing members of a construction similar to that shown at 56 and 32. Also carried by the cover at the bore 71 thereof and surrounding the shaft 66 is an oil seal 73. The top of the casing 31 is provided with a cover plate 74 which carries a vent plug 75. The cover plate 74 is held to the casing by means of cap screws 76. It will be seen from the construction for the casing just described that the casing provides an oil sump at 77 and normally the pinion 64 is bathed in the oil 78 in said sump. The inner end of the shaft 66 is received within a casing 80 which is attached at the rear end of casing 31. Casing 80 may be termed the power drive reducer casing as it supports therein a shaft 81 which is carried between bearings 82 and 83 of the type which has previously been described and shown at 32. The shaft 81 carries a worm gear 84 which meshes with a gear 85 mounted upon a transverse shaft 86 carried by the casing in suitable bearings, not shown. Gear 87 carried by shaft 86 is in mesh with worm gear 88 carried on the end of the shaft 66. Oil 78 when it is at a certain level within the sump portion 77 of the main gear casing may flow into the casing 80 by means of the ports shown at 88a, to partially fill the casing 80 to the same level as in casing 31. The shaft 81 extends outwardly from the casing 80 and carries a pinion 89. This pinion is in mesh with a ring gear 90 which surrounds the annular flange 21 of the bearing block and is seated on shoulder 91.

The shaft 66 at its outer end carries a propeller fan 92. Interposed between the main gear casing and the bearing block 20 is a drag bearing designated generally as 100 and comprising two ring members 102 and 104. The bearing block 20 at its upper base end is provided with an annular shoulder 101 which supports ring member 102 of the drag bearing. Member 102 is provided with an inner tapered or conical surface 103, the slope of the surface converging downwardly. A second ring member 104 of said drag bearing has a tapered outer surface 105 adapted to seat against the conical surface 103 and bearing member 104 is positioned on a shouldered portion 106 between the base of the casing 31 and a cylindrical portion 107 at right angles to portion 106 which joins the hub 30. The drag bearing ring 104 is substantially polygonal in cross section and has greater depth than the bearing 102 so as to separate wall 106 of casing 31 from the top or flanged portion of bearing block 20 when bearing members 102 and 104 co-engage. The drag bearing 104 is illustrated in plan in FIGURE 5 and wherein the top surface or side at 110 is substantially at right angles to the inner side or surface 111 with the beveled surface 112 extending therebetween and with the outer beveled side or surface 105 for contact with the beveled surface of bearing member 102. A series of inclined ports 114 extend between the beveled side or surface 112 to the beveled surface 105. The inclined ports terminate in depressed surfaces 115 lying in the beveled surface 105.

The base of the casing 31 is provided with a transverse bore 120, FIGURE 6, which opens adjacent the beveled surface 112 of bearing member 104. The bore 120 is adapted to receive an upstanding tube or nipple 121 threaded or otherwise held in said bore, the upper end of the nipple is adapted to internally house an orifice plug 122. The orifice plug has an orifice 123 of a certain size, as hereinafter set forth. Externally, the nipple 121 carries an external coupling 124, as by threading and the coupling is internally provided with a felt disk at 125 and with a screen 126 between the disk and the orifice plug. The nipple or tube 121 is positioned as shown in FIGURE 2 wherein the open end of the coupling lies above the top surface of the oil 78.

The operation, uses and advantages of my invention are as follows.

When the wind machine is operated, the engine 3 through the engine transmission turns the shaft 8 and in turn the elongated shaft 12 which produces rotation of the pinion 64, beveled gear 67 which is secured to the shaft 66 to produce rotation of the propeller fan 92. Rotation of shaft 66 causes rotation of shaft 81 of a rotation speed reducer which includes the worm and gearing shown at 84, 85, 87 and 88 to drive shaft 81 which in turn rotates the pinion 89. This pinion is in mesh with the teeth of ring gear 90 and as the propeller fan is turned, the entire head assembly is horizontally rotated on a vertical axis. The rotating head assembly includes the main gear casing 31 and the gearing therein with the power drive reducer casing 80 connected to the main gear casing with the gearing therein. The pinion travels around the ring gear 90 and the drag bearing 100 imposes a constant friction to the turning movement of the rotating head assembly and the bearing block 20. It is understood that oil 78 is within the main gear casing and as the pinion and gear 64 and 65 rotates, oil will splash upwardly from the sump and into the coupling 126 for passage through the screen and felt disk at 124 and 125 and thence through the orifice of the orifice plug 122 into tube 121 for reception in the space included between the beveled face 112 and the walls 106 and 107 for transmittal through the ports 114 for reception between the co-engaging inclined or beveled faces 103 and 105 of the drag bearing members 102 and 104. Preferably the drag bearing member 104 is formed from a non-metallic graphite impregnated material while the drag bearing member 102 is formed from metallic material. I may use for the graphite impregnated material a phenolic or urea resin known under the trademark Formica. In the arrangement shown for the drag bearing 100 between the hub 30 of the main gear casing and the bearing block 20, the head assembly will rotate once in four and one-half minutes while the propeller fan is so geared that it will move air at approximately 65 feet a second. The arrangement shown for the various parts of the apparatus is such that the head assembly rotates about a vertical axis smoothly and without jerky action. I have found that a wind machine, to be effective for frost protection, must utilize a large diameter non-rigid and flexible propeller fan blades. As the aerodynamic loading on these blades is not always symmetrical due to shifting of the propeller fan dynamic center of gravity produced by the blades flexing and by divergent instability from operation in gusty or cross winds, moments are generated of varying magnitude and direction in the propeller fan shaft which causes rotation of the head assembly to be jerky. The combined moments produced by jerky operation in the rotation of the head assembly, together with the moments produced by the vertical drive shaft torque, may, unless restrained, cause failure in the head rotation parts. As an example, the first wind machine units constructed with a rotating head assembly, the head assembly being supported on tapered roller bearings, resulted in failure occurring in the head rotating mechanism. This permitted the torque of the vertical drive shaft to spin the head assembly to destruction. Thereafter the strength of the rotation component parts for the head assembly was increased to a practical maximum and the same failure of parts was again experienced. After the present invention was developed wherein the tapered roller bearings were replaced with the drag bearing of the present invention, I found that a drag bearing prevented the divergent moments mentioned above from being transmitted to the rotation mechanism of the head assembly and resulted in smooth rotation of said head assembly and without failure. The drag bearing as described, works best when using a metallic ring and a ring of non-metallic material which prevents galling of the bearing surfaces.

While the drag bearing requires a minimum of lubrication it is to be noted that its location at a distance above the ground level makes the usual method of manual lubrication at intervals uncertain. Failure of the unit can cause a loss of ten or more acres of valuable crops. Therefore, an automatic lubrication system is provided by the use of the tube 121 carrying the orifice plug 122. By way of example, the orifice 123 of the orifice plug 122 is of .040″ in diameter and allows passage of one drop of oil in three minutes using oil having a gravity of SAE 140. The space within the coupling above the felt washer 125 holds twenty drops of oil which thereby assures an oil supply during motor operation and splash of oil from the sump into said coupling. As the tube with its coupling extends above the top of the oil 77, no oil enters the coupling and the tube when the pinion and gear 64 and 67 are not being rotated. This feature prevents loss of oil from the main gear case 31 during periods of non-operation, which may be as long in many instances as nine months.

Another feature of importance in my invention is the fact that the head assembly must rotate about its vertical axis approximately once in four and one-half minutes. While it has been found that a slower rate of rotation will cause the air jet from the propeller to be driven a greater distance, however, it has likewise been ascertained that complete restratification of air occurs in approximately five minutes and the benefits of temperature inversion is therefore lost unless the air from the propeller fan again mixes the air before restratification occurs.

I claim:

1. In a wind machine having a column, the lower end of which is anchored to a support, an elongated shaft extending from top to bottom of the column and a motor for rotating the shaft, the combination therewith, of: a head assembly for rotation about a vertical axis at the column top and comprising a gear casing and a rotation speed reducer casing, a propeller fan shaft extending through said gear casing and outwardly thereof for one end thereof and into the power drive casing for the opposite end thereof, gearing between the propeller fan shaft and the vertical drive shaft for rotating the propeller fan shaft, and speed reducer gearing driven by the propeller fan shaft in the rotation speed reducer casing, said gear casing provided with a hub, and a bearing block for receiving said hub, said bearing block being secure at the top of said column, a ring gear for said bearing block, a pinion in mesh with the teeth of said ring gear to be driven by the gearing in said rotation speed reducer casing, and means between the bearing block and the hub for producing uniform rotation of the head assembly when the motor is driving the elongated shaft.

2. The structure of claim 1; said means comprising a drag bearing having an outer ring provided with an inner conical face and an inner ring provided with an external conical face for engagement with the conical face of the first ring.

3. The structure of claim 2; one ring of said drag bearing being metallic and the other ring being non-metallic.

4. A wind machine having a vertical column, an elongated shaft within the column and a motor for rotating said elongated shaft, the combination therewith, of: a bearing block at the column top provided with a conical bore, a hub having a conical surface within said conical bore of the bearing block and a drag bearing between the hub and the bearing block; a gear casing secured to the hub and a propeller fan shaft supported by said gear casing, gearing within said gear casing connecting the elongated shaft to the propeller fan shaft for rotating said propeller fan shaft, and means between said propeller fan shaft and the bearing block for rotating the gear casing about a vertical axis at a reduced speed of rotation from that of the propeller fan shaft.

5. The device of claim 4, said gear casing formed with an oil sump portion, and means for directing oil from the sump to the drag bearing during rotation of the propeller fan shaft.

6. The device of claim 5, said means comprising an elongated tube extending to the drag bearing and above the level of oil in the oil sump, and metering means within said tube for metering the oil delivered thereby to the drag bearing.

References Cited by the Examiner
UNITED STATES PATENTS

| | | | |
|---|---|---|---|
| 1,905,502 | 4/1933 | Reid | 230—270 |
| 2,722,374 | 11/1955 | King | 230—273 |
| 2,966,763 | 1/1961 | Ferrell | 47—2 |

LAURENCE V. EFNER, *Primary Examiner.*